(12) United States Patent
Booppanon et al.

(10) Patent No.: US 8,559,063 B1
(45) Date of Patent: Oct. 15, 2013

(54) DOCUMENT SCANNING AND VISUALIZATION SYSTEM USING A MOBILE DEVICE

(71) Applicants: Sarasin Booppanon, Bangkok (TH); Chanwut Sangsok, Bangkok (TH); Supichai Kantrasiri, Bangkok (TH); Apiwat Pituksin, Pathumthani (TH); Pituk Kaewsuksai, Nakhonratchasima (TH); Nut Phanitch, Bangkok (TH)

(72) Inventors: Sarasin Booppanon, Bangkok (TH); Chanwut Sangsok, Bangkok (TH); Supichai Kantrasiri, Bangkok (TH); Apiwat Pituksin, Pathumthani (TH); Pituk Kaewsuksai, Nakhonratchasima (TH); Nut Phanitch, Bangkok (TH)

(73) Assignee: Atiz Innovation Co., Ltd., Bangkok (TH)

( * ) Notice: Subject to any disclaimer, the term of this patent is extended or adjusted under 35 U.S.C. 154(b) by 0 days.

(21) Appl. No.: 13/776,712

(22) Filed: Feb. 26, 2013

Related U.S. Application Data

(63) Continuation-in-part of application No. 13/690,487, filed on Nov. 30, 2012.

(51) Int. Cl.
*G03B 15/00* (2006.01)

(52) U.S. Cl.
USPC ............... 358/302; 396/419; 362/3

(58) Field of Classification Search
None
See application file for complete search history.

(56) References Cited

U.S. PATENT DOCUMENTS

| | | | | |
|---|---|---|---|---|
| 4,574,318 A | * | 3/1986 | Dayton et al. | 358/483 |
| 5,051,838 A | * | 9/1991 | Cho et al. | 358/401 |
| 5,247,330 A | * | 9/1993 | Ohyama et al. | 355/64 |
| 5,774,237 A | * | 6/1998 | Nako | 358/471 |
| 6,065,839 A | * | 5/2000 | Miyata et al. | 353/122 |
| 6,540,415 B1 | * | 4/2003 | Slatter et al. | 396/428 |
| 6,704,124 B2 | | 3/2004 | Hu et al. | |
| 6,746,029 B2 | * | 6/2004 | Chu et al. | 280/47.35 |
| 6,752,554 B1 | | 6/2004 | Brittingham | |
| 6,886,104 B1 | | 4/2005 | McClurg et al. | |
| 6,899,934 B2 | * | 5/2005 | Beyer | 428/40.1 |
| 6,975,360 B2 | * | 12/2005 | Slatter | 348/370 |
| 6,991,158 B2 | | 1/2006 | Munte | |
| 7,046,404 B2 | | 5/2006 | Cheatle et al. | |
| 7,173,628 B1 | * | 2/2007 | Kawai | 345/531 |
| 7,317,557 B2 | * | 1/2008 | Pollard et al. | 358/448 |
| 7,330,604 B2 | * | 2/2008 | Wu et al. | 382/289 |
| 7,419,100 B2 | | 9/2008 | Groeneboer et al. | |
| 7,583,416 B2 | | 9/2009 | Brugger et al. | |
| 7,593,605 B2 | | 9/2009 | King et al. | |
| 7,953,441 B2 | * | 5/2011 | Lors | 455/557 |

(Continued)

FOREIGN PATENT DOCUMENTS

| AU | 2010313758 A1 | 6/2012 |
|---|---|---|
| CN | 101561863 A | 10/2009 |

(Continued)

*Primary Examiner* — King Poon
*Assistant Examiner* — Ted Barnes
(74) *Attorney, Agent, or Firm* — Raj Abhyanker, P.C.

(57) ABSTRACT

Disclosed is a system, method, and/or apparatus to scan and/or visualize a document placed on a document placement deck and to automatically adjust the image of the document scanned using a mobile device. In one embodiment, the document scanning and visualization system comprises a base element comprising a document placement deck; a neck element comprising a head end and a base end and coupled to the base element at the base end; and a doublet of lighting arms comprising a first lighting arm and a second lighting arm. In this embodiment, the first lighting arm and the second lighting arm are coupled to at least one of the base element and the neck element and are positioned above the base element.

8 Claims, 17 Drawing Sheets

(56) References Cited

U.S. PATENT DOCUMENTS

| | | |
|---|---|---|
| 7,978,900 B2 | 7/2011 | Nepomniachtchi et al. |
| 8,077,335 B2 | 12/2011 | Ookuma |
| 8,098,391 B2 | 1/2012 | Kiplinger et al. |
| 8,107,135 B2 | 1/2012 | Moore et al. |
| 8,134,759 B2 * | 3/2012 | Albahri .................. 358/474 |
| 8,149,481 B2 | 4/2012 | Dufresne Du Virel |
| 8,189,965 B2 | 5/2012 | Edgar et al. |
| 8,194,292 B2 | 6/2012 | Cook et al. |
| 8,199,370 B2 * | 6/2012 | Irwin et al. .............. 358/474 |
| 8,254,985 B2 | 8/2012 | Ekicl et al. |
| 8,294,915 B2 | 10/2012 | Nachman |
| 8,305,659 B2 | 11/2012 | Chen |
| 8,306,335 B2 | 11/2012 | Lukac |
| 8,325,344 B2 * | 12/2012 | Lee et al. .................. 356/445 |
| 2001/0010025 A1 | 7/2001 | Knust et al. |
| 2002/0186425 A1 | 12/2002 | Dufaux et al. |
| 2003/0002091 A1 | 1/2003 | Hou |
| 2003/0193612 A1 | 10/2003 | Oliver |
| 2004/0166272 A1 * | 8/2004 | Beyer ...................... 428/40.1 |
| 2004/0258327 A1 | 12/2004 | Cheatle et al. |
| 2006/0045379 A1 * | 3/2006 | Heaney et al. ............ 382/276 |
| 2006/0152345 A1 * | 7/2006 | Aitkenhead .............. 340/384.1 |
| 2007/0269109 A1 | 11/2007 | Ziv-El |
| 2008/0088890 A1 | 4/2008 | Dufresne de Virel |
| 2008/0130070 A1 | 6/2008 | Walker et al. |
| 2009/0021798 A1 * | 1/2009 | Abahri ...................... 358/474 |
| 2010/0289739 A1 | 11/2010 | Tamura et al. |
| 2010/0322373 A1 | 12/2010 | Churilla |
| 2010/0331043 A1 * | 12/2010 | Chapman et al. ......... 455/556.1 |
| 2011/0149284 A1 * | 6/2011 | Lee et al. .................. 356/432 |
| 2011/0193473 A1 * | 8/2011 | Sanders et al. ............ 313/483 |
| 2011/0249306 A1 | 10/2011 | De Muelenaere et al. |
| 2012/0081764 A1 | 4/2012 | Ho et al. |
| 2012/0188440 A1 | 7/2012 | Takeuchi |
| 2012/0250112 A1 * | 10/2012 | Ogawa et al. .............. 358/479 |
| 2012/0281244 A1 | 11/2012 | Guarnera et al. |
| 2012/0293783 A1 | 11/2012 | Ishida et al. |
| 2012/0294652 A1 | 11/2012 | Itoh et al. |
| 2012/0300269 A1 | 11/2012 | Suen et al. |

FOREIGN PATENT DOCUMENTS

| | | |
|---|---|---|
| CN | 102158625 A | 8/2011 |
| EP | 0926876 B1 | 10/2002 |
| EP | 1772763 A1 | 4/2007 |
| EP | 1802094 A2 | 6/2007 |
| EP | 1915006 A2 | 4/2008 |
| EP | 2007126 A1 | 12/2008 |
| JP | 2001024974 A | 1/2001 |
| JP | 2009290809 A | 12/2009 |
| JP | 2012203776 A | 10/2012 |
| KR | 101027306 B1 | 4/2011 |
| KR | 101164218 B1 | 7/2012 |
| WO | 2005038506 A1 | 4/2005 |
| WO | 2006098695 A1 | 9/2006 |
| WO | 2012097398 A1 | 7/2012 |
| WO | 2012109997 A1 | 8/2012 |
| WO | 2012123703 A1 | 9/2012 |
| WO | 2012144634 A1 | 10/2012 |
| WO | 2012151173 A1 | 11/2012 |

* cited by examiner

DOCUMENT SCANNING AND VISUALIZATION SYSTEM USING A MOBILE DEVICE

CLAIM OF PRIORITY

This non-provisional application is a continuation-in-part (CIP) application of U.S. patent application Ser. No. 13/690,487 filed on Nov. 30, 2012.

FIELD OF TECHNOLOGY

This disclosure relates generally to document scanning technology, in one example embodiment, to a system, method, and/or apparatus to scan and/or visualize a document placed on a document placement deck and to automatically adjust the image scanned using a mobile application on a mobile device.

BACKGROUND

Scanning paper based documents, such as text and graphics, into an electronic format for analysis, distribution, and archiving, has often been the functional domain of flatbed scanners. Such conventional scanners may convert documents, including papers and pictures, into images which may be used as such, or could be processed via an optical character recognition tool and/or software. Other popular conventional scanners may include sheet-fed scanners, which may provide ease and convenience over flatbed scanners through a mechanism to automatically feed the documents to be scanned. Such scanners may provide a controlled environment by using a closed top to isolate the document to shield the document from external optical factors, such as light and glare. Such an optically controlled environment may be necessary to create digital documents with superior characteristics. Some modern-day scanners may have embedded functionality (e.g. touch screens, WiFi® capability), providing the capability to perform actions beyond scanning. However, more robust, resource-heavy tasks may require a data connection to a computing device, such as a desktop or laptop computer, either via the network or a USB interface to perform the necessary operations. Thus, such scanners may only provide the functionality of advanced analysis, distribution, and archiving, when coupled with an attached computing device. In the mobile device arena, mobile software applications may exist to manipulate images of text and graphics captured using the camera of a mobile device. However, such devices may, optically, be in an uncontrolled environment and may be heavily dependent on the environmental factors of the location where the image is captured. Such applications may also be unable to perform an automatic color balance, resolution, and geometric aspect correction of a document. Thus, such devices may be unable to create digital documents with comparable quality as those created by a conventional flatbed cover-top scanner, creating a closed environment.

SUMMARY

Disclosed is a system, method, and/or apparatus to scan and/or visualize a document placed on a document placement deck of a document scanning and visualization system and to automatically adjust the image scanned using a mobile device. In one aspect, a document scanning system comprises a base element comprising a document placement deck; a neck element comprising a head end and a base end and coupled to the base element at the base end; and a doublet of lighting arms comprising a first lighting arm and a second lighting arm. In this aspect, the first lighting arm and the second lighting arm are coupled to at least one of the base element and the neck element and are positioned above the base element.

In this aspect, the first lighting arm comprises at least a first lighting element coupled to the first lighting arm and the second lighting arm comprises at least a second lighting element coupled to the second lighting arm. Additionally, the first lighting element and the second lighting element emit a total light color temperature of at least 3,500 to 6,500 Kelvin. Moreover, the first lighting element and the second lighting element are positioned symmetrically with respect to a center point on the document placement deck, and the first lighting element and the second lighting element generate a combined brightness output on a top surface of the document placement deck of between 1,000 to 2,500 lux. In this aspect, a docking head coupled to the head end of the neck element and comprising an image capture opening and a docking cradle and a mobile device positioned in the docking cradle and having a user interface face of the mobile device directed away from the document placement deck and an image capture lens directed toward the document placement deck through the image capture opening to capture a scanned image.

The document scanning system may further comprise: a slightly adhesive layer applied to the surface of the document placement deck and a switch coupled to at least one of the first lighting arm and the second lighting arm and used to turn on the first lighting arm and the second lighting arm, wherein the switch is at least one of a tactile switch, an electromechanical switch, a capacitive switch, a remote switch, and a sensor switch. Moreover, the mobile device may be at least one of a smartphone, a digital camera, a tablet computer, a digital audio player, a personal digital assistant, a thin-client device, and a personal computing device. Additionally, the document placement deck may comprise a matte finish.

In one aspect, the docking head may comprise a docking port that charges the mobile device and allows the mobile device to communicate with a display unit through an adapter connection. In a similar aspect, the mobile device may communicate with a display unit through a wireless network. In either case, the display unit comprises at least one of a television, a monitor, and a projector. In another aspect, the docking head may be removable. Finally, in yet another aspect, the base element may be slightly inclined.

In another aspect, the document scanning system comprises: a base element comprising a document placement deck and a polychromatic color chart, wherein the polychromatic color chart comprises a true color indicator element; a neck element comprising a head end and a base end and coupled to the base element at the base end; and a doublet of lighting arms comprising a first lighting arm and a second lighting arm. In this aspect, the first lighting arm and the second lighting arm are coupled to at least one of the base element and the neck element and are positioned above the base element. The document scanning system may also comprise a docking head coupled to the head end of the neck element and comprising an image capture opening and a docking cradle.

In this aspect, a mobile device may be positioned in the docking cradle and may have a user interface face of the mobile device directed away from the document placement deck and an image capture lens directed toward the document placement deck through the image capture opening to capture a scanned image. The aforementioned mobile device may comprise: a memory, a processor coupled to the memory, and a mobile application comprising a set of instructions stored in the memory. This set of instructions, when executed by the processor, cause the mobile device to: capture the scanned image having a captured color profile of the scanned image and a present image of the true color indicator; query a stored color profile in a color profile database; match at least one color of the present image against a corresponding color of the color profile; create a color compensation factor; and compensate for a color of the captured color profile of the scanned image to enhance the captured color profile of the scanned image.

The document scanning system may further comprise a switch coupled to at least one of the first lighting arm and the second lighting arm and used to turn on the first lighting arm and the second lighting arm, wherein the switch is at least one of a tactile switch, an electromechanical switch, a capacitive switch, a remote switch, and a sensor switch.

In this aspect, the first lighting arm may comprise at least a first lighting element coupled to the first lighting arm and the second lighting arm may comprise at least a second lighting element coupled to the second lighting arm. The first lighting element and the second lighting element may emit a total light color temperature of at least 3,500 to 6,500 Kelvin. Additionally, the first lighting element and the second lighting element may be positioned symmetrically with respect to a center point on the document placement deck; and the first lighting element and the second lighting element may generate a combined brightness output on a top surface of the document placement deck of between 1,000 to 2,500 lux. Moreover, the docking head may comprise a docking port that charges the mobile device and allows the mobile device to communicate with a display unit through at least one of an adapter connection and a wireless network, and wherein the display unit comprises at least one of a television, a monitor, and a projector. In this aspect, the docking head may also be removable.

Furthermore, the polychromatic color chart may comprise a color balance indicator and the set of instructions stored in the memory further comprises instructions, which when executed by the processor, cause the mobile device to: query a stored color balance profile in a color balance profile database, capture a present image of the color balance indicator, match the present image of the color balance indicator against the stored color balance profile, create a color balance compensation factor, and compensate for a color balance profile of the scanned image.

In another aspect, the polychromatic color chart comprises an authenticator and the set of instructions stored in the memory further comprises instructions, which when executed by the processor, cause the mobile device to: query a stored authenticator in an authenticator database, capture a present image of the authenticator, match the present image of the authenticator against the stored authenticator, and initiate a command by the processor of the mobile device if the present image of the authenticator matches the stored authenticator. The command may comprise at least one of an advertisement display, a watermark stamp, a limited functionality command, and a bypass a shutdown command.

Moreover, the polychromatic color chart may comprise a two pixel-per-inch (PPI) indicators separated by a distance and the set of instructions stored in the memory further comprises instructions, which when executed by the processor, cause the mobile device to: query a distance database for a physical distance between the two PPI indicators, capture a distance image of the distance between the two PPI indicators, compare the distance image with a width of the scanned image, calculate a physical size of the scanned image based on the physical distance between the two PPI indicators, and calculate a pixel-per-inch value based on the physical size of the scanned image calculated. After such a calculation, the processor may instruct the mobile device to configure the calculated PPI to the image file's property.

Finally, the mobile device may be at least one of a smartphone, a digital camera, a tablet computer, a digital audio player, a personal digital assistant, a thin-client device, and a personal computing device and the document placement deck may comprise a matte finish.

In yet another aspect, a document visualization and presentation system, comprises: a base element comprising a document placement deck, a neck element comprising a head end and a base end and coupled to the base element at the base end, and a doublet of lighting arms comprising a first lighting arm and a second lighting arm. In this aspect, the first lighting arm and the second lighting arm are coupled to at least one of the base element and the neck element and are positioned above the base element. Furthermore, the first lighting arm comprises at least a first lighting element coupled to the first lighting arm and the second lighting arm comprises at least a second lighting element coupled to the second lighting arm. Additionally, the first lighting element and the second lighting element emit a total light color temperature of at least 3,500 to 6,500 Kelvin.

The first lighting element and the second lighting element may be positioned symmetrically with respect to a center point on the document placement deck, and the first lighting element and the second lighting element may generate a combined brightness output on a top surface of the document placement deck of between 1,000 to 2,500 lux.

Furthermore, a docking head may be coupled to the head end of the neck element and comprising an image capture opening and a docking cradle, wherein the docking head comprises a docking port that charges the mobile device and allows the mobile device to communicate with a display unit through at least one of an adapter connection and a wireless network, and wherein the display unit comprises at least one of a television, a monitor, and a projector.

Additionally, a mobile device may be positioned in the docking cradle and may have a user interface face of the mobile device directed away from the document placement deck and an image capture lens directed toward the document placement deck through the image capture opening to capture at least an image and a video to be visualized on the display unit. Finally, the aforementioned mobile device may be at least one of a smartphone, a digital camera, a tablet computer, a digital audio player, a personal digital assistant, a thin-client device, and a personal computing device.

DETAILED DESCRIPTION

Figure 1:
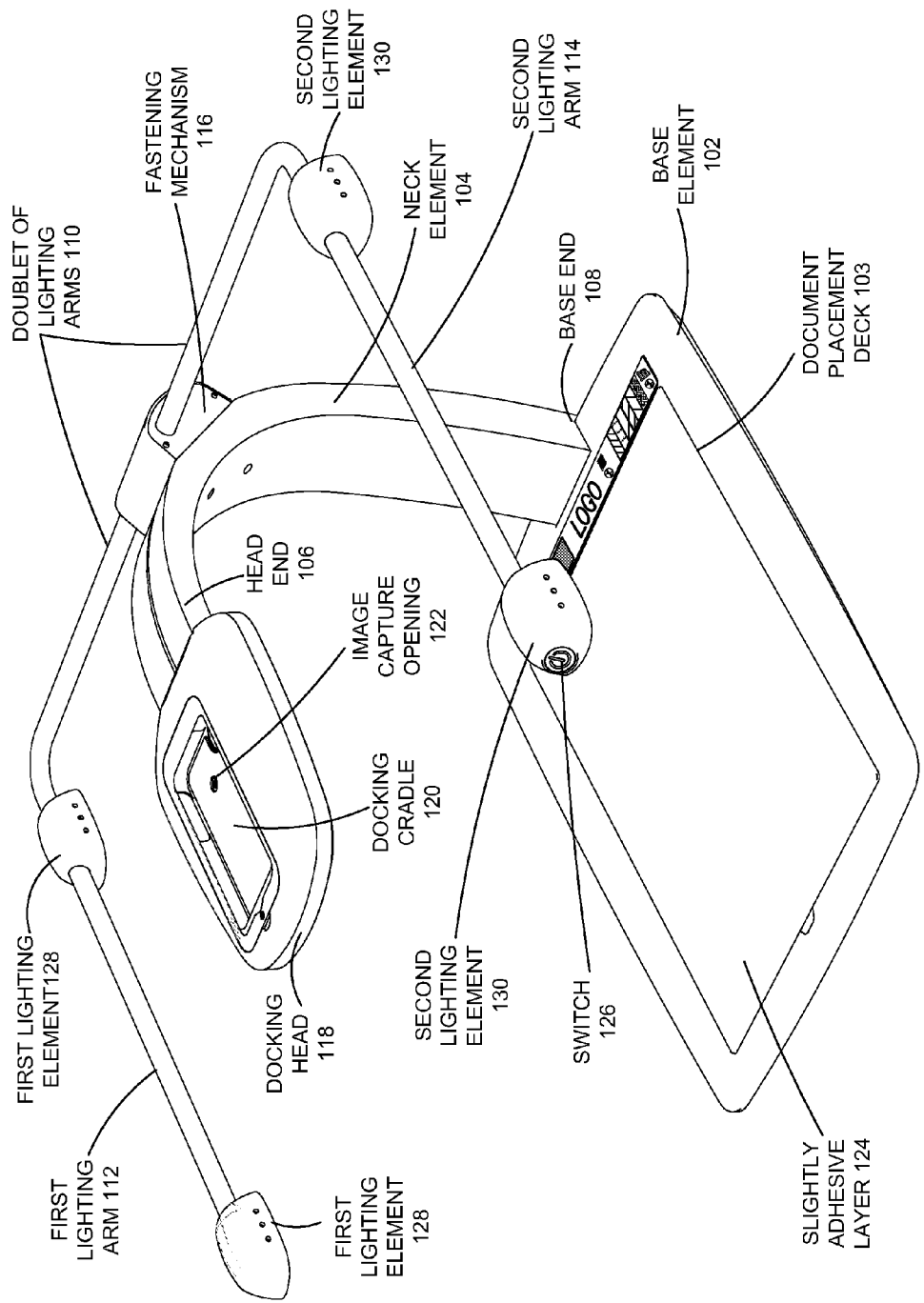
FIG. 1 represents a perspective view of a document scanning system, to be used in conjunction with a mobile device.

A document scanning system 100 may comprise of a base element 102; a document placement deck 103; a neck element 104 comprising a head end 106 and a base end 108 and coupled to the base element 102 at the base end 108; a doublet of lighting arms 110 comprising a first lighting arm 112 and a second lighting arm 114; a docking head 118 coupled to the head end 106 of the neck element 104 and comprising an image capture opening 122 and a docking cradle 120; and a mobile device positioned in the docking cradle 120 and having a face of the mobile device directed away from the document placement deck 103 and an image capture lens directed toward the document placement deck 103 through the image capture opening 122 to capture a scanned image.

The first lighting arm 112 and the second lighting arm 114 may comprise of the first lighting arm 112 and the second lighting arm 114 coupled to at least one of the base element 102 and the neck element 104 and positioned above the base element 102. The first lighting arm 112 may comprise at least a first lighting element 128 coupled to the first lighting arm 112 and the second lighting arm 114 may comprise at least a second lighting element 130 coupled to the second lighting arm 114. The first lighting element 128 and the second lighting element 130 may be arranged in such symmetry that the total light color temperature of at least 3,500 to 6,500 Kelvin is emitted. The first lighting element 128 and the second lighting element 130 may be positioned symmetrically with respect to a center point on the document placement deck 103. The first lighting element 128 and the second lighting element 130 may generate a combined brightness output on a top surface of the document placement deck 103 of between 1,000 to 2,500 lux.

In another embodiment, a slightly adhesive layer 124 may be applied on to the document placement deck 103 to hold the document in place. The slightly adhesive layer 124 may be such that upon removal of the document from the document placement deck 103, no residue may be detected on the document. The slightly adhesive layer 124 may serve to simply hold the document in one location on the document placement desk 103. In yet another embodiment, a switch 126 may be coupled to at least the first lighting arm 112 and the second lighting arm 114 and used to turn on and/or turn off the first lighting element 128 coupled to the first lighting arm 112 and the second lighting element 130 coupled to the second lighting arm 114. The switch may also be coupled to the neck element 104 or the base element 102. The switch 126 may be at least one of a tactile switch, an electromechanical switch, a capacitive switch, a remote switch, and a sensor switch.

In yet another embodiment, the document placement deck 103 may comprise a matte finish. The matte finish may prevent light from at least one of the first lighting element 128 and the second lighting element 130 from reflecting off the document placement deck 103 and towards the docking head 118. In another embodiment, the docking head 118 may comprise a docking port that charges the mobile device and allows the mobile device to communicate with a display unit through at least one of an adapter connection and a wireless network, wherein the display unit comprises at least one of a television, a monitor, a projector, and any other device capable of displaying an image. In one embodiment the docking head 118 may be removable. In another embodiment, the docking head may comprise of a sensor which may automatically turn on the first lighting element 128 and the second lighting elements 130 upon detecting the presence of a mobile device positioned on the docking cradle 120. Conversely, the sensor may turn off the first lighting elements 128 and the second lighting elements 130 upon detecting the removal of the mobile device from the docking cradle 120.

In yet another embodiment the base element 102 may be slightly inclined. In another embodiment, the base element 102 may comprise a polychromatic color chart 132, where in the polychromatic chart may comprise of a true color indicator element 134.

In one or more embodiments, the mobile device may be at least one of a smartphone, a digital camera, a tablet computer, a digital audio player, a personal digital assistance, a thin-client device and a personal computing device, and the docking head 118 and docking cradle are customized in length, breadth, and width to seat the mobile device. The mobile device may comprise a memory module, a processor module coupled to the memory module and a mobile application comprising a set of instructions stored in the memory, which when executed by the processor, may cause the mobile device to capture the scanned image having a captured color profile of the scanned image and a present image of the true color indicator 134.

The processor may also cause the mobile device to query a stored color profile in a color profile database and match at least one color of the present image against a corresponding color profile, and create a color compensation factor, using which a compensation of color may occur in the captured color profile of the scanned image.

In one or more embodiments, the polychromatic color chart 132 may comprise a color balance indicator 136 and the set of instructions stored in the memory which further comprises of instructions which when executed by the processor causes the mobile device to query a stored color balance profile in a color balance profile database, capture a present image of the color balance indicator 136, match the present image of the color balance indicator 136 against the stored color balance profile, create a color balanced compensation factor and compensate for a color balance profile of the scanned image.

In one or more embodiments, the polychromatic color chart 132 may compromise an authenticator and a set of instructions in the memory further comprising instructions which when executed by the processor may cause the mobile device to query a stored authenticator in an authenticator database, capture a present image of the authenticator, match the present image of the authenticator against the stored authenticator and initiate a command by the processor of the mobile device if the present image of the authenticator matches the stored authenticator wherein the command comprises at least one of an advertisement display, a water stamp, a limited functionality command, and a bypass a shutdown command. In one or more embodiments, the polychromatic color chart 132 may comprise two pixel-per-inch (PPI) indicators 140 separated by a distance and the set of instructions stored in memory may further comprise instructions which when executed by the processor, may cause the mobile device to query a distance database for a physical distance between the two PPI indicators 140, capture a distance image of the distance between the two PPI indicators 140, compare the distance image with a width of the scanned image, calculate a physical size of the scanned image on the physical distance between the two PPI indicators 140, and calculate a pixel-per-inch value based on the physical size of the scanned image calculated. After such a calculation, the processor may instruct the mobile device to configure the calculated PPI to the image file's property. In one or more embodiments, the document scanning system 100 may be made up of at least one of plastic, polymer, any metal, and suitable material to create structural objects.

Any embodiment of the document scanning system 100, or variations thereof, may also be used as a document visualization and presentation system when the docking head may comprise a docking port that charges the mobile device and allows the mobile device to communicate with a display unit through an adapter connection. In a similar aspect, the mobile device may communicate with a display unit through a wireless network. In either case, the display unit comprises at least one of a television, a monitor, a projector, and any other device capable of displaying an image, and a mobile device positioned in the docking cradle and having a user interface face if the mobile device directed away from the document placement deck 103 and an image capture lens directed toward the document placement deck 103 through the image capture opening 122 to capture at least an image and a video to be visualized on the display unit.

FIG. 1 represents a preferred embodiment of a document scanning system 100 to be used in conjunction with a mobile device. The illustrated document scanning system 100 includes a base element 102, further comprising of a document placement deck 103, a neck element 104 which connects to the base element 102 at the base end 108. The neck element 104 connects to a docking head 118 via the head end 106 of the neck element 104. The docking head 118 comprises of a docking cradle 120 to position a mobile device having a user interface of the mobile device directed away from the document placement deck 103; the image capture lens of the mobile device directed toward the document placement deck 103 through the image capture opening 122, on the docking cradle 120, to capture a scanned image. The base element 102 further comprises of a slightly 'no residue' adhesive layer 124 applied to the surface of the document placement deck 103. The document scanning system 100 further comprises of a doublet of lighting arms 110 comprising a first lighting arm 112 and a second lighting arm 114 wherein the first lighting arm 112 and the second lighting arm 114 are coupled to the neck element 104 using a fastening mechanism 116. The first lighting arm comprises two first lighting element 128 coupled to the first lighting arm 112, and the second lighting arm comprises the second lighting element 130 and the first lighting arm 112 coupled to the second lighting arm 114. The first lighting element and the second lighting element are positioned symmetrically with respect to the center point of the document placement deck 103. The first lighting elements 128 and the second lighting element 130 emit a total light color temperature of at least 3,500 to 6,500 Kelvin. The first lighting elements 128 and the second lighting element 130 generate a combined brightness output on a top surface of the document placement deck between 1,000 to 2,500 lux. The document scanning system 100 further comprises of a switch 126 coupled to the second lighting element 130 to manually turn off or on the first lighting element 128 and the second lighting element 130. The base element 102 also comprises of a polychromatic color chart 132 wherein the polychromatic color chart comprises a true color indicator element 134, a color balance indicator 136, an authenticator 138, and a two pixel-per-inch indicators 140, performing the respective actions as described above.

The exposure shift values Ev(ch) in each channel of RGB are calculated using $$Ev(ch) = \frac{\sum_{i=1}^{4} G_i(ch) - G_i^{standard}(ch)}{4}$$

where $G_i(ch)$ is the RGB channel of gray color in the polychromatic color chart. $G_i(ch)$ values may correspond to (0,0,0), (80,80,80), (160,160,160), and (220,220,220). $G^{standard}$ is standard gray color in the polychromatic color chart.

The overall exposure shift value $Ev_{avg}$ of the polychromatic color chart is calculated by using $$Ev_{avg} = \frac{\sum_{i=1}^{3}(G_i(r) + G_i(g) + G_i(b))}{9}$$

Images are then color-balanced by using equation $$P^e(x,y,ch) = P(x,y,ch) - EV_{avg} - Ev(ch)$$

and enhanced (normalize) with $$P^{en}(x, y, ch) = \frac{P^e(x, y, ch) - \text{Min}(P^e(ch))}{\text{Max}(P^e(ch)) - \text{Min}(P^e(ch))} \times 255$$

where $P^e(ch)$ are the pixel of image in channel RGB after color balancing and $P^{en}(ch)$ are the pixel of image after enhancing.

The final process of true color of each channel $P^t$ are computed from $$P^t(x,y,ch) = P^{en}(x,y,ch) - W(ch)$$

where, in an example, white balance W(ch) in each channel of RGB are $$W(ch) = C(ch) - C^{standard}(ch)$$

where, C(ch) is RGB color of the image from camera and $C^{standard}$ is standard RGB color of the polychromatic color chart; $C_i(ch)$ values may correspond to (255,0,0), (0,255,0), (0,0,255), (0,175,239), (236,38,143), and (255,242,18). After color balancing, the color channel is normalized to adjust scale again.

Figure 2:
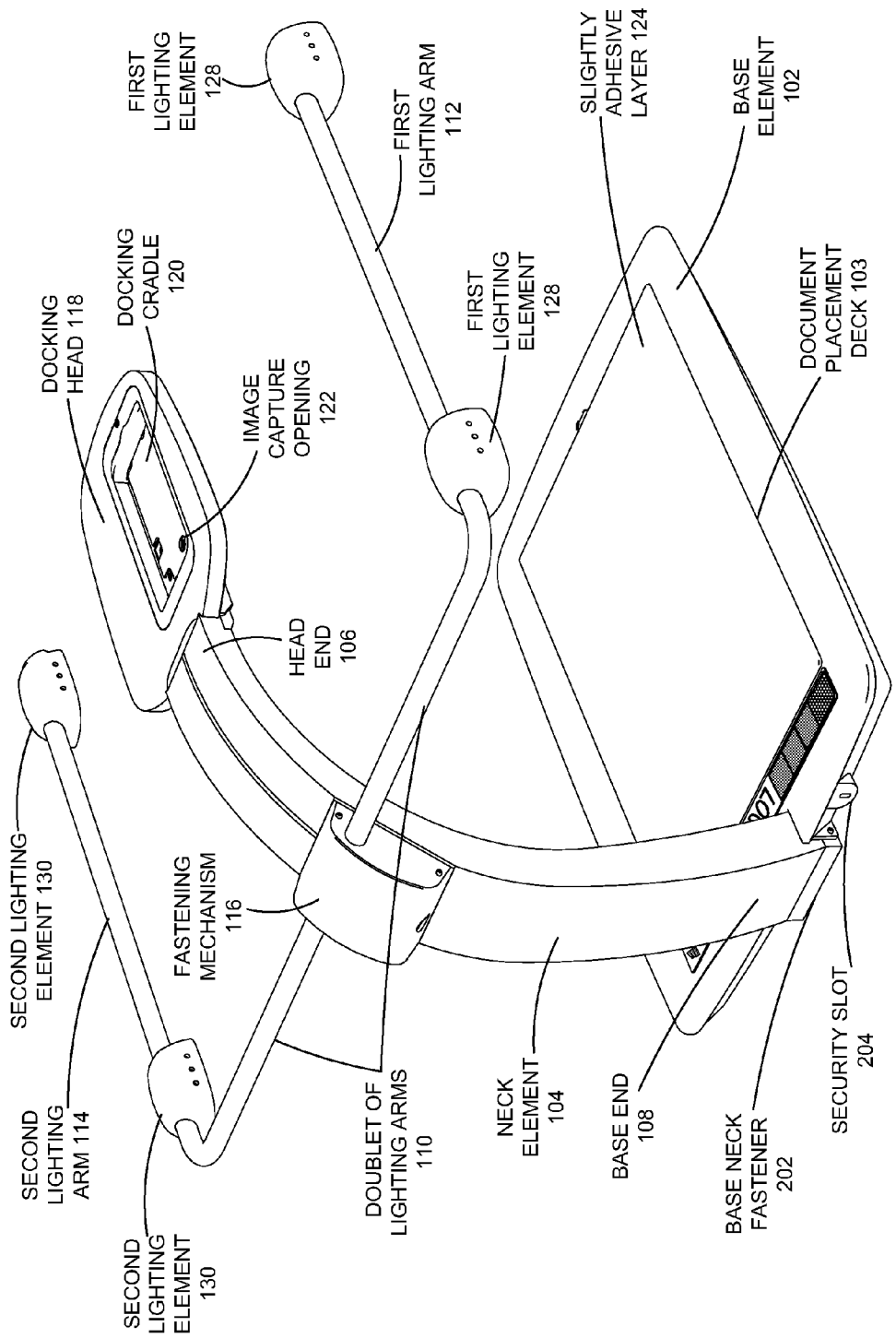
FIG. 2 represents a perspective view of the document scanning system of FIG. 1, as seen from the rear.

FIG. 2 represents a perspective view from the rear of the preferred embodiment. The base element 102 and the base end 108 of the neck element 104 are fastened together using a base-neck fastener 202. The base-neck fastener 202 maintains the base end 108 in a fixed position. The lateral dimension of the neck element may measure 60 mm. FIG. 2 also shows a security slot 204 which may be used to secure the document scanning system 100 (e.g., with a Kensington® lock).

Figure 3:
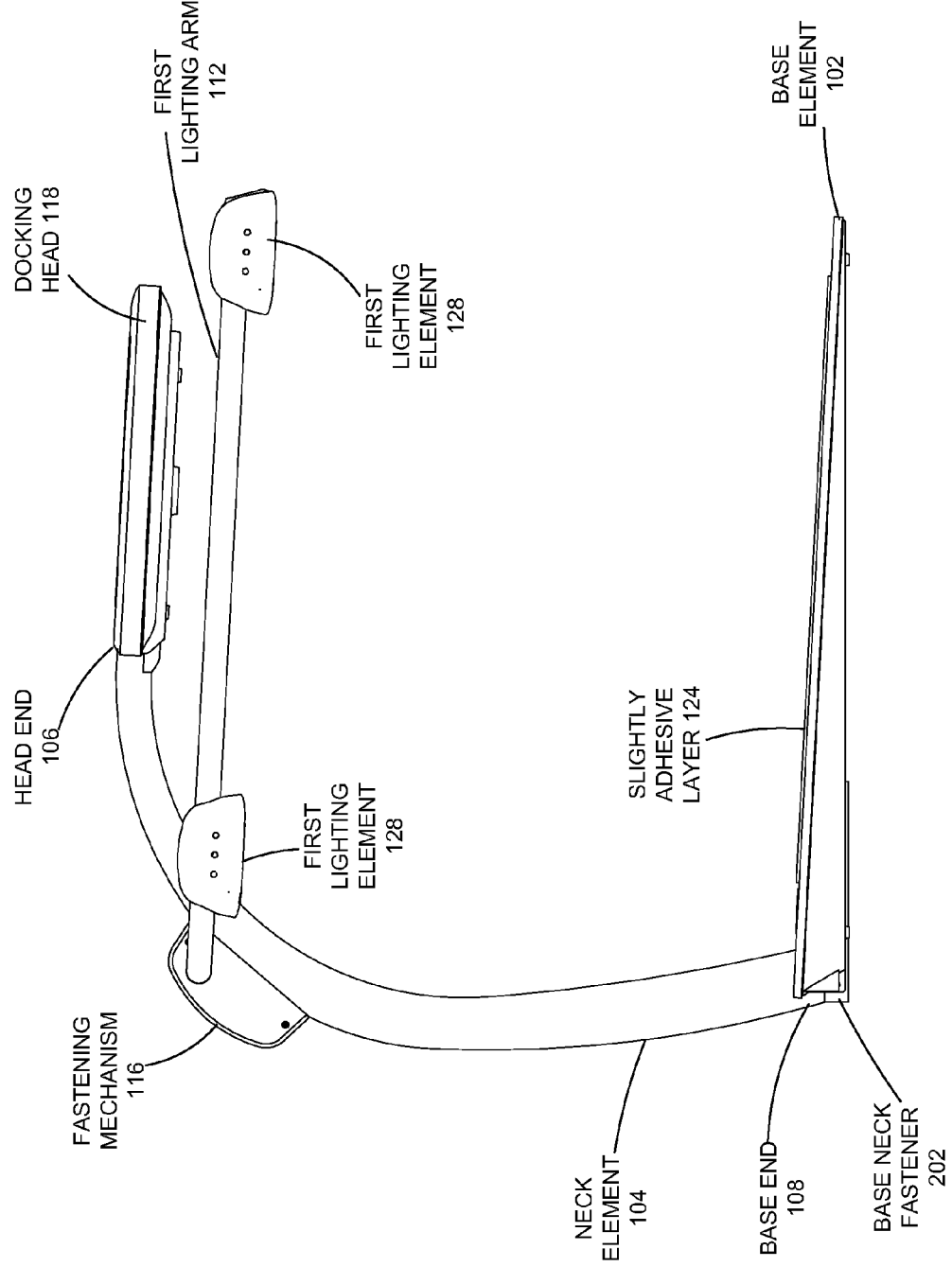
FIG. 3 represents a right side view of the document scanning system of FIG. 1.

FIG. 3 represents the right side view of the preferred embodiment. The base element 102 is inclined at three degrees for proper luminosity and image capture of the document. This incline may also improve visibility of the image to the user. The lateral dimension of the docking head 118 may measure 190.43 mm from end to end. The skewed vertical dimension, from the first lighting element 128 to the base element 102 may measure 304.91 mm. The vertical dimension, from the base of the base element 102 to the top of the docking head, may measure 377.23 mm.

Figure 4:
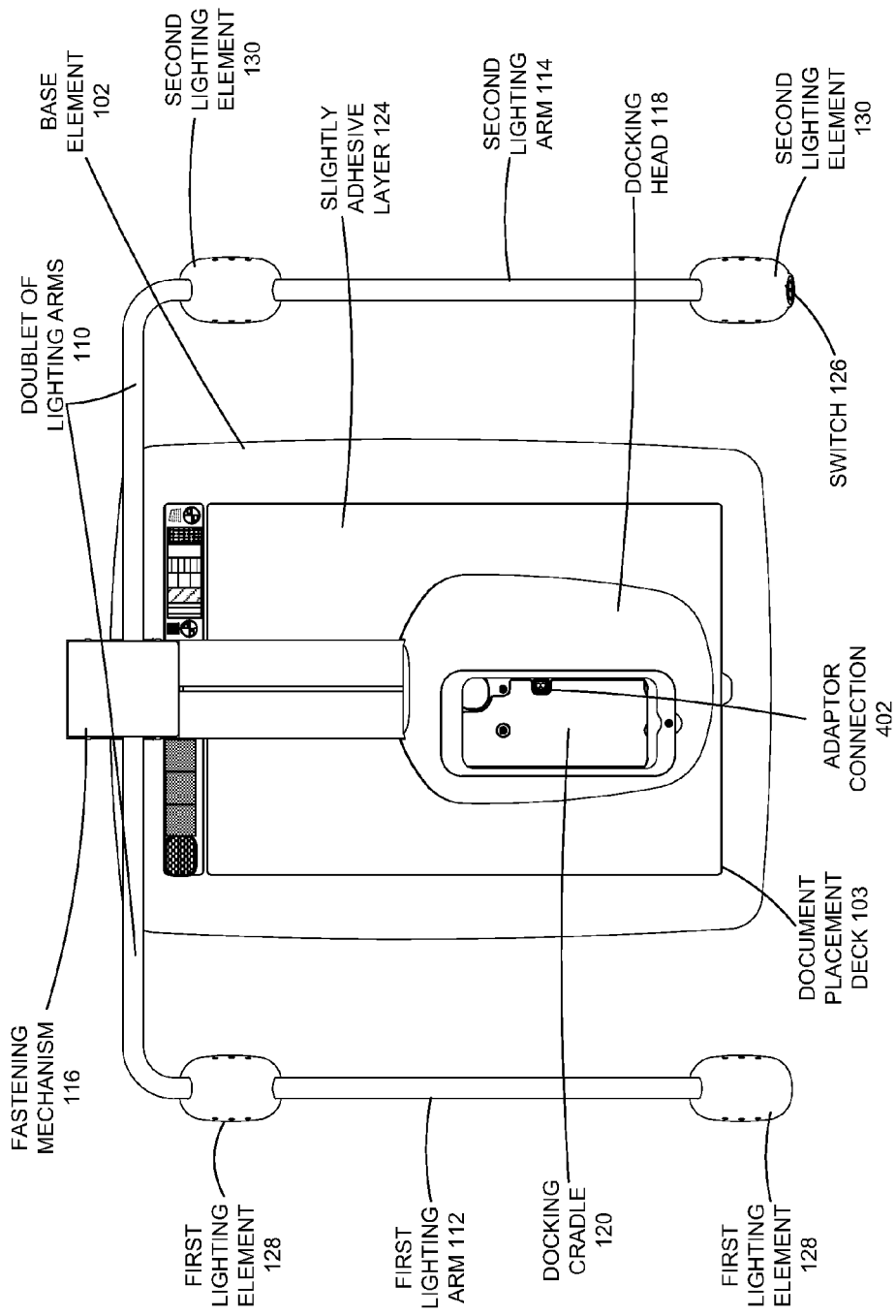
FIG. 4 represents a top view of the document scanning system of FIG. 1.

FIG. 4 represents the top view of the preferred embodiment. The docking cradle 120 comprises of an adaptor connection 402 which may perform actions, including, but not limited to, charging the mobile device, transmitting the contents of the mobile application to an attached visual display unit, and acting as sensor detecting the presence of the mobile device on the docking cradle 120. FIG. 4 demonstrates a position of the docking cradle 120 that is aligned with the head end 106 of the neck element 104 and is positioned at the center of the head end 106. In another embodiment, the positions of the docking cradle 120 may not be aligned with the head 106 of the neck element 104. Specifically, this positioning of the docking cradle 120 may allow for the camera lens of the mobile device to be directly above the center of document placement deck 103.

The vertical dimension, from the base of the document placement deck 103 to the top of the fastening mechanism 116 may measure 427.96 mm. In one embodiment, the vertical dimension from the base of the document placement deck 103 to the doublet of lighting arms 110 measures approximately 420.00 mm. The vertical dimension of the document placement deck 103 at its highest point may measure 30.7 mm. The lateral dimension of the document placement deck 103 may measure 224 mm. The vertical dimension of the polychromatic color chart 132 may measure 20.0 mm. The lateral dimension, from the middle of the first light element 128 and the second lighting element 130, may measure 484.84 mm. The lateral dimension of the docking head 118 may measure 139.13 mm. The lateral dimension of the base element may measure 304.74 mm.

Figure 5:
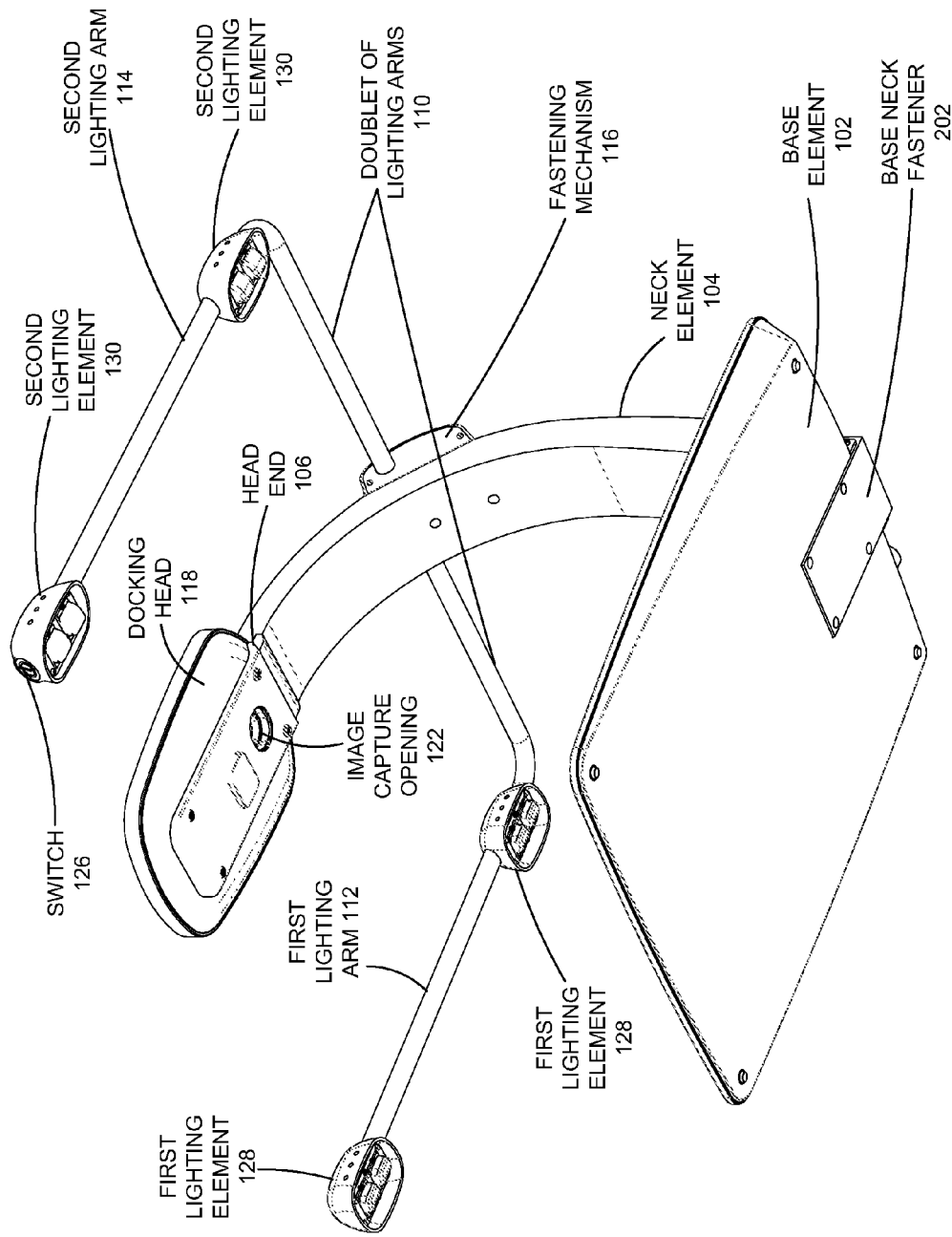
FIG. 5 represents a perspective view of the document scanning system as seen from the underneath of FIG. 1.

FIG. 5 represents a perspective illustration as seen from the bottom of the preferred embodiment. In particular, FIG. 5 depicts the base-neck fastener 202 secured to the base element 102. In addition, an image capture opening 122 is shown on the underside of the docking head 118.

Figure 6:
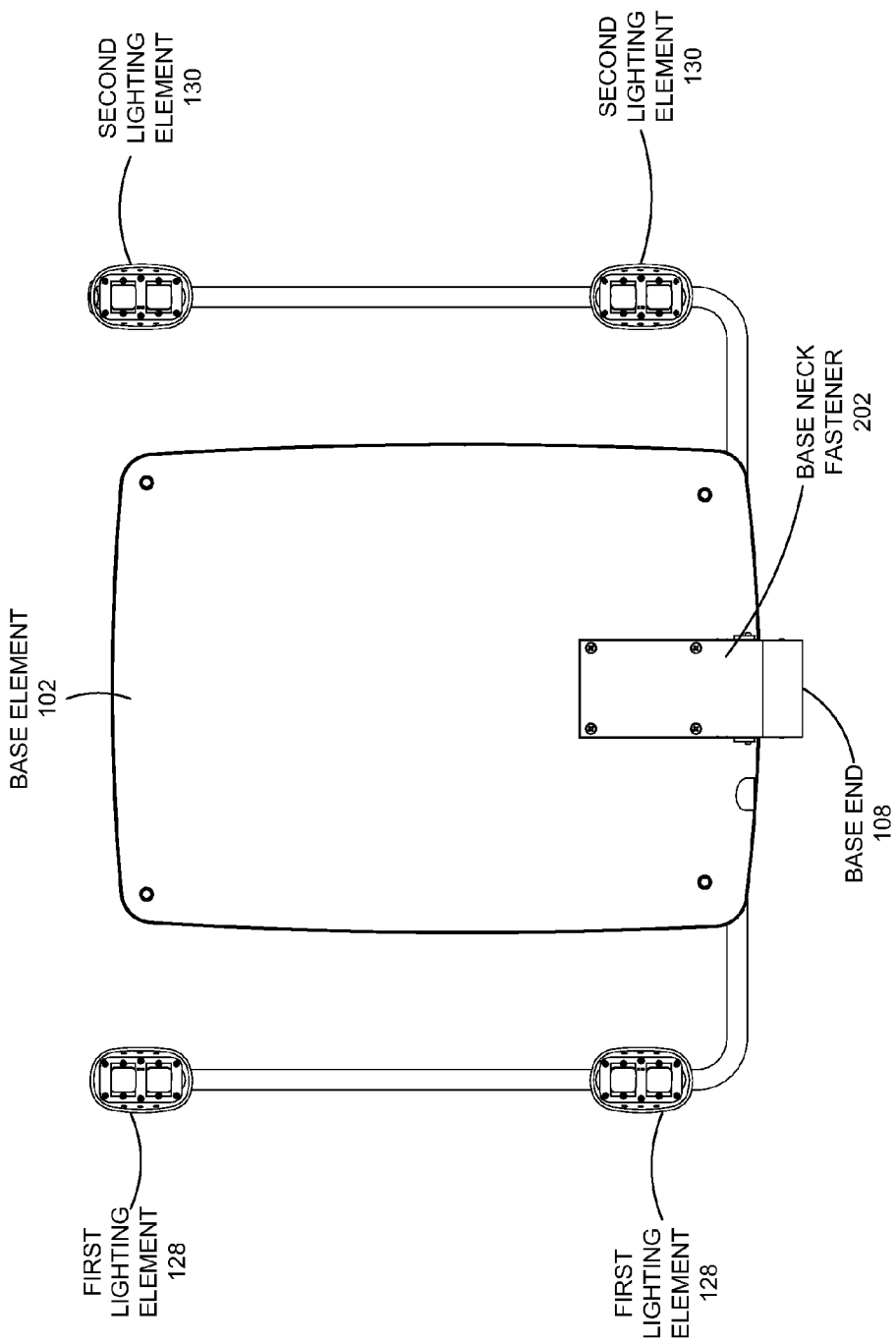
FIG. 6 represents a bottom view of the document scanning system of FIG. 1.

FIG. 6 represents a view from the bottom of the preferred embodiment displaying first lighting elements 128 and the second lighting elements 130.

Figure 7:
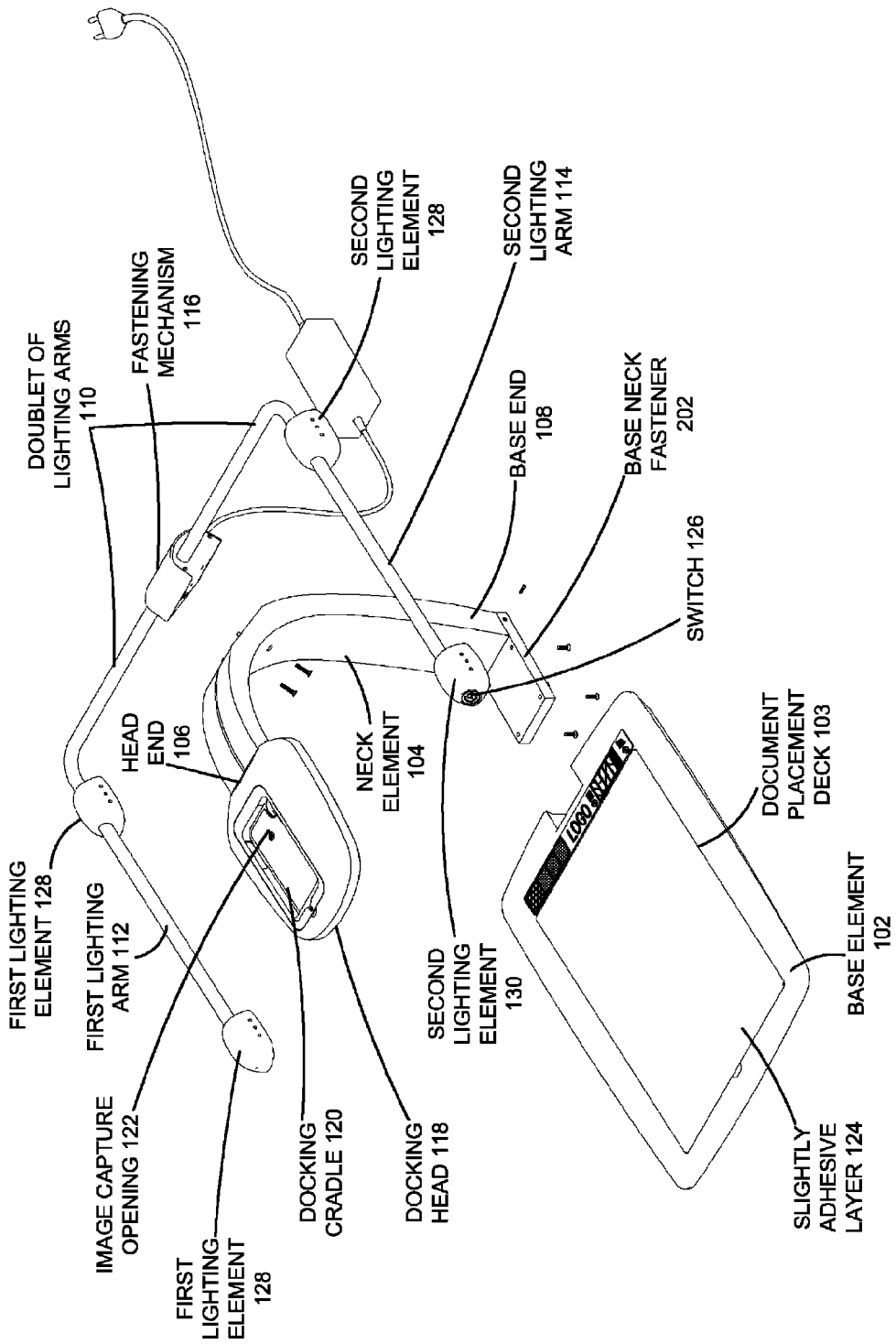
FIG. 7 represents a perspective of a partially exploded view of the document scanning system of FIG. 1.

FIG. 7 represents a perspective of a partially exploded view of the preferred embodiment. Specifically, FIG. 7 portrays the base-neck fastener 202 and the neck element 104 detached from the document placement deck 103. Additionally, the fastening mechanism 116 is shown detached from the neck element 104.

Figure 8:
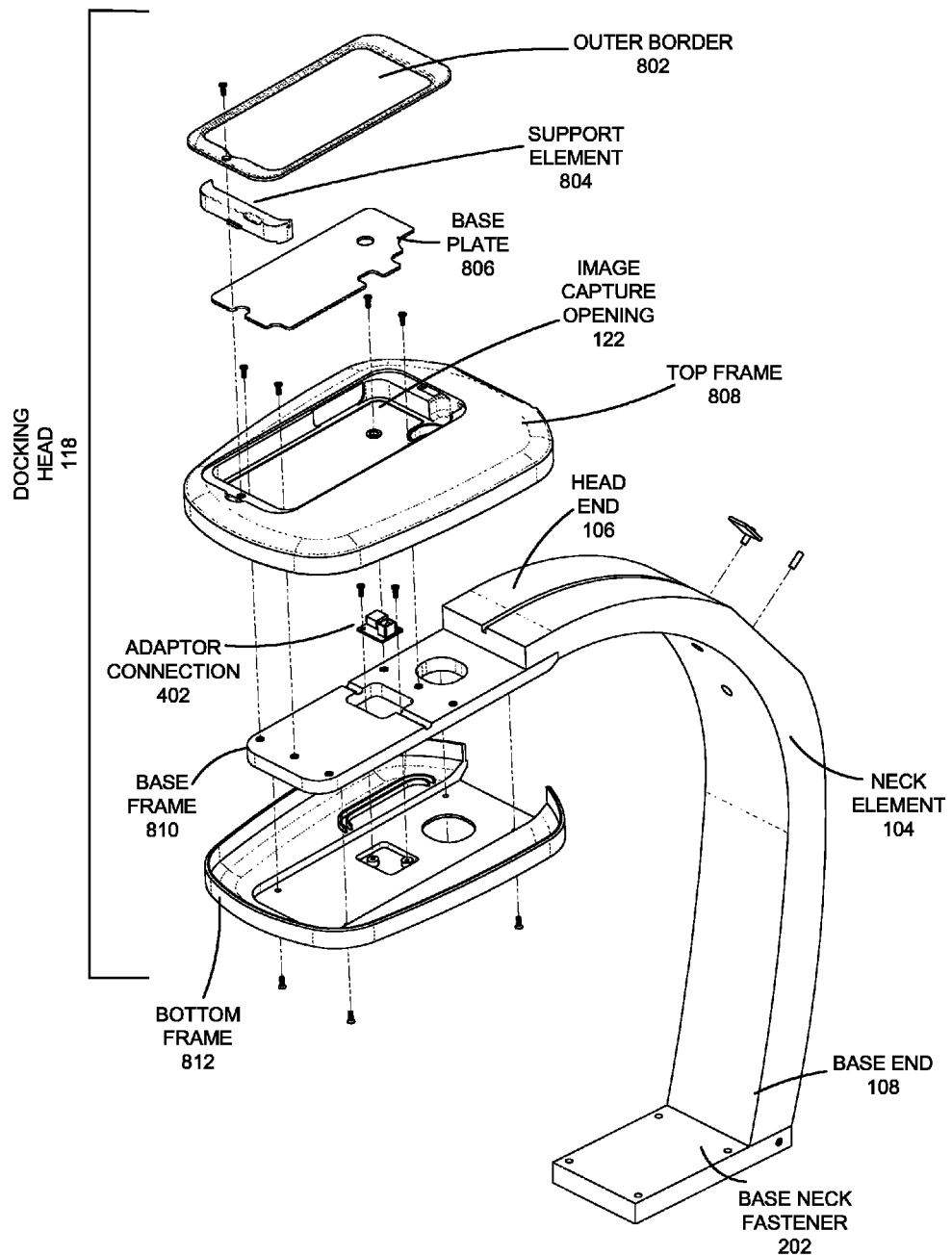
FIG. 8 represents a perspective of an exploded view of the docking head and assembly of the neck element of the document scanning system.

FIG. 8 represents a perspective of an exploded view of the docking head and assembly of the neck element of the preferred embodiment. Specifically, the docking head 118 comprises of an outer border 802, a support element 804, a base plate 806, a top frame 808, a base frame 810 and a bottom frame 812.

Figure 9:
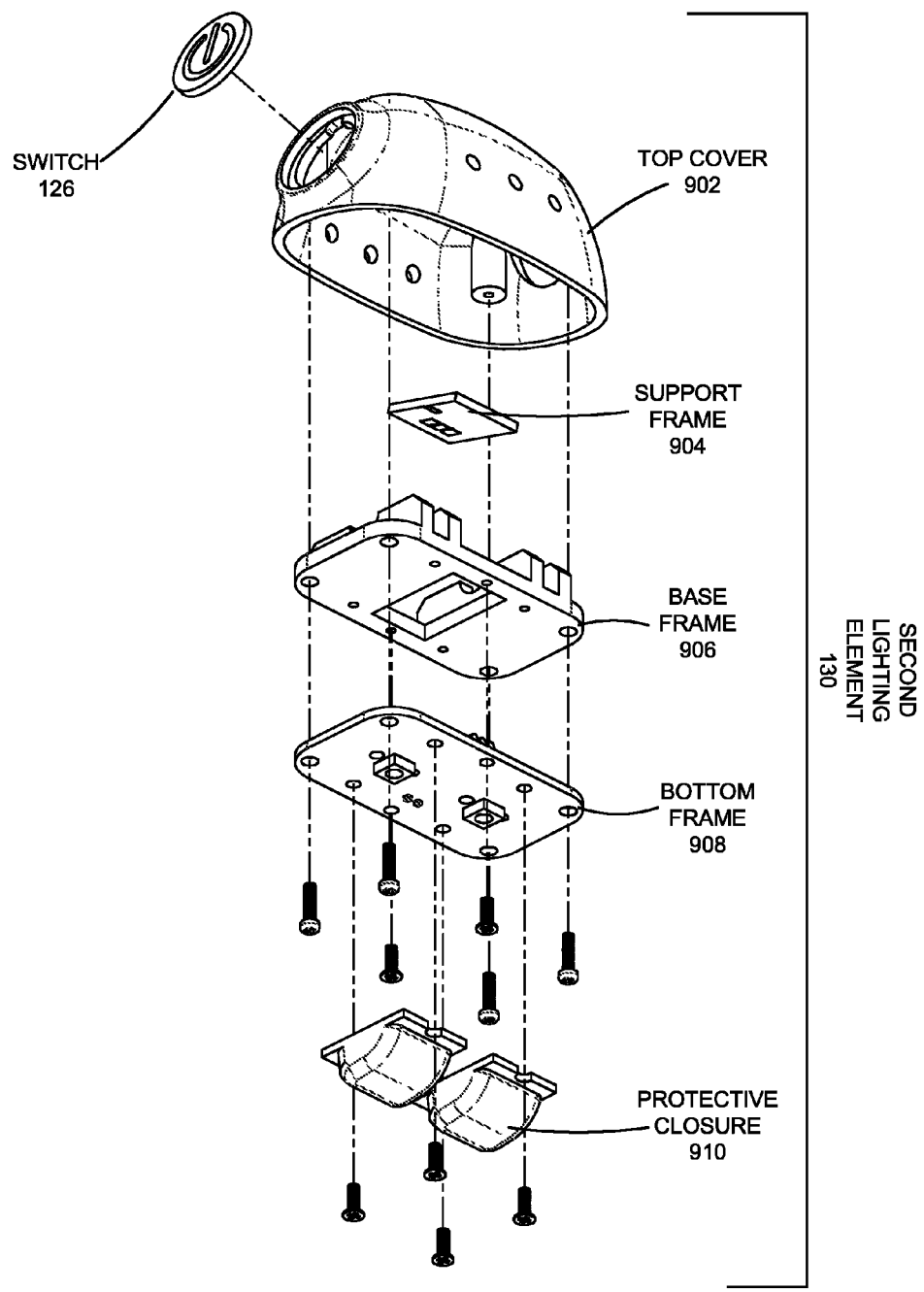
FIG. 9 represents the configuration of the second lighting element.

FIG. 9 represents the configuration of the second lighting element 130 of the preferred embodiment 100. The second lighting element 130 comprises of a top cover 902, a support frame 904 for a switch 126, a base frame 906, a bottom frame 908, and a protective closure 910 for the light source of the second lighting element 130. The same configuration without the switch 126 is used for the first lighting element 128.

Figure 10:
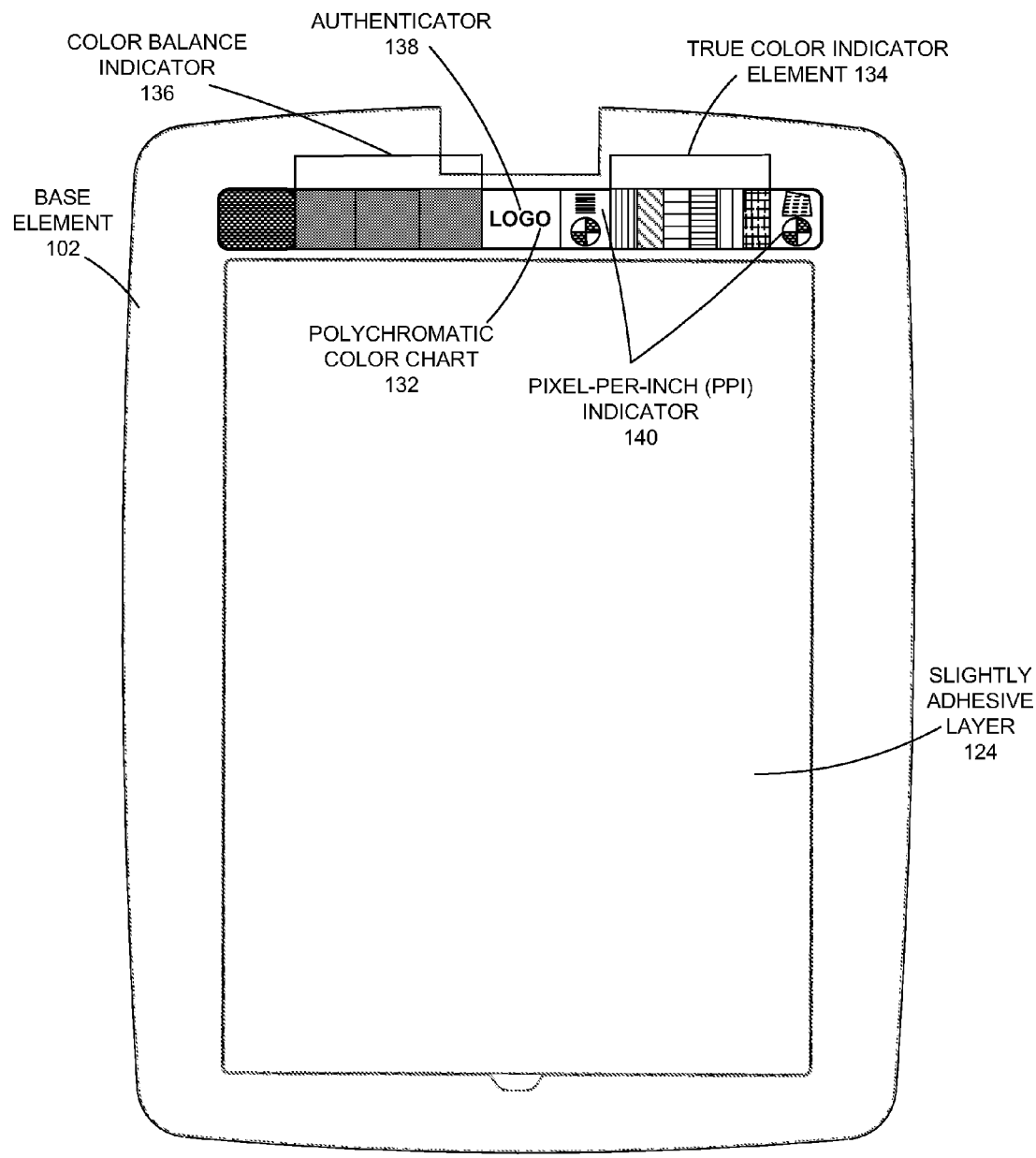
FIG. 10 represents the base element comprising a no residue, slightly adhesive layer on the surface of the document placement deck of the said base element.

FIG. 10 represents the preferred embodiment of the base element 102 comprising a no residue, slightly adhesive layer 124 on the surface of the document placement deck 103 of the said base element 102. In addition, FIG. 10 depicts a polychromatic color chart 132 located on the base element 102. The polychromatic color chart 132 comprises of color balance indicators 136, an authenticator 138, indicators 140, and true color indicator elements 134. The true color indicator elements 134 may further comprise a red or pink element, a green element, a blue element, a gray or silver element, a violet or purple element, and/or a yellow element.

Figure 11A:
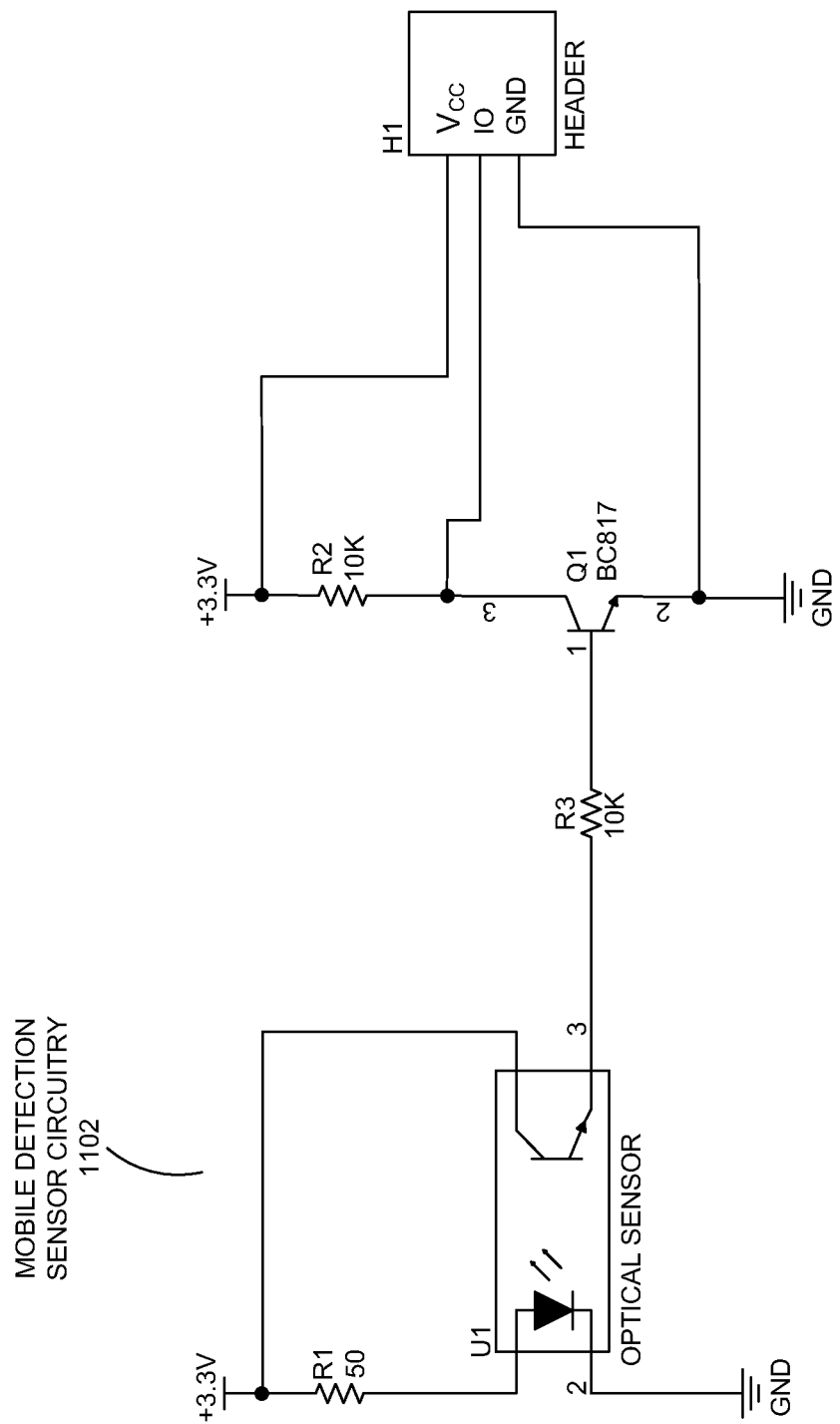
FIG. 11A provides a representation of a mobile device detection circuitry for the document scanning system.
Figure 11B:
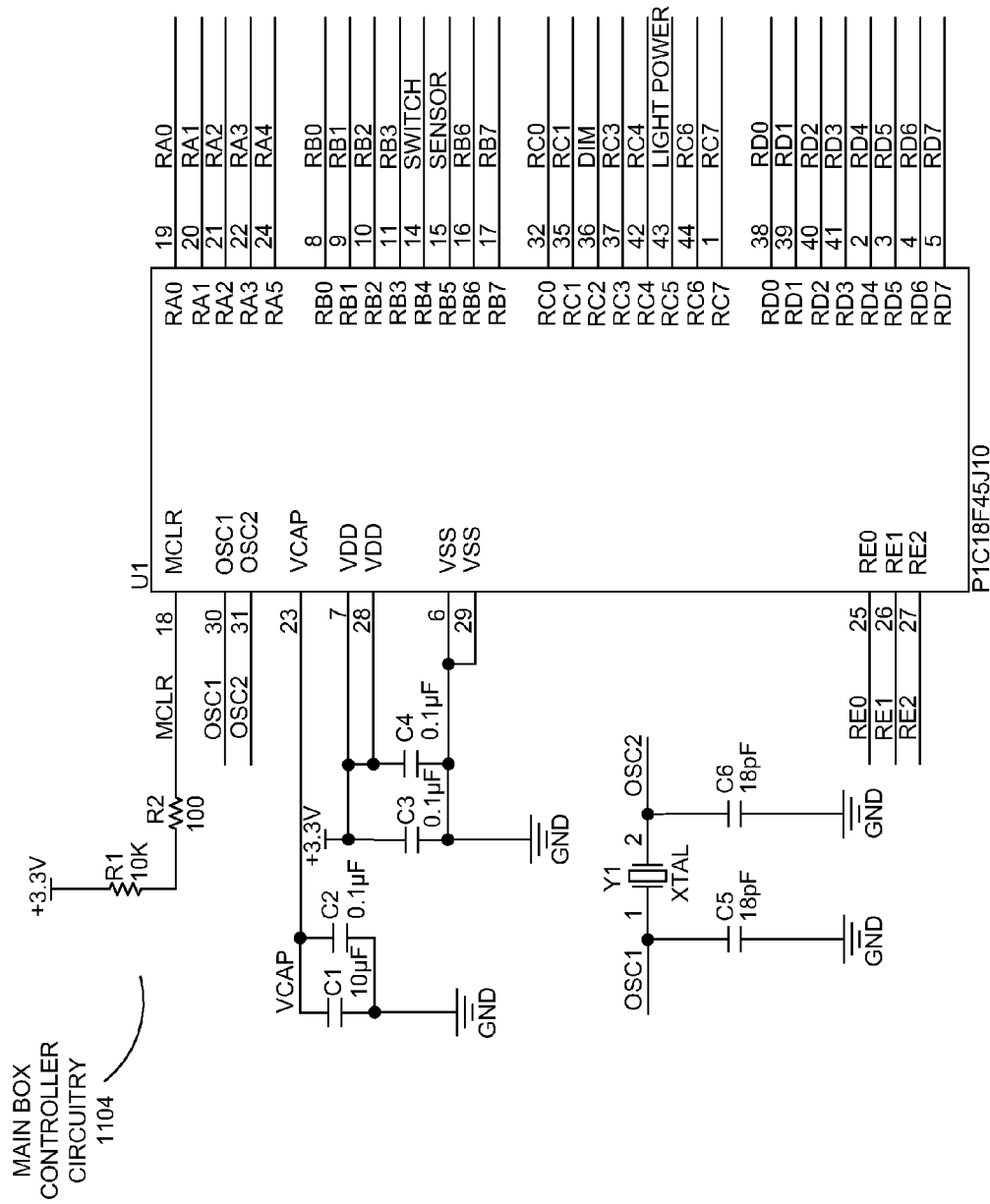
FIG. 11B provides a representation of a main box controller circuitry of the document scanning system.
Figure 11C:
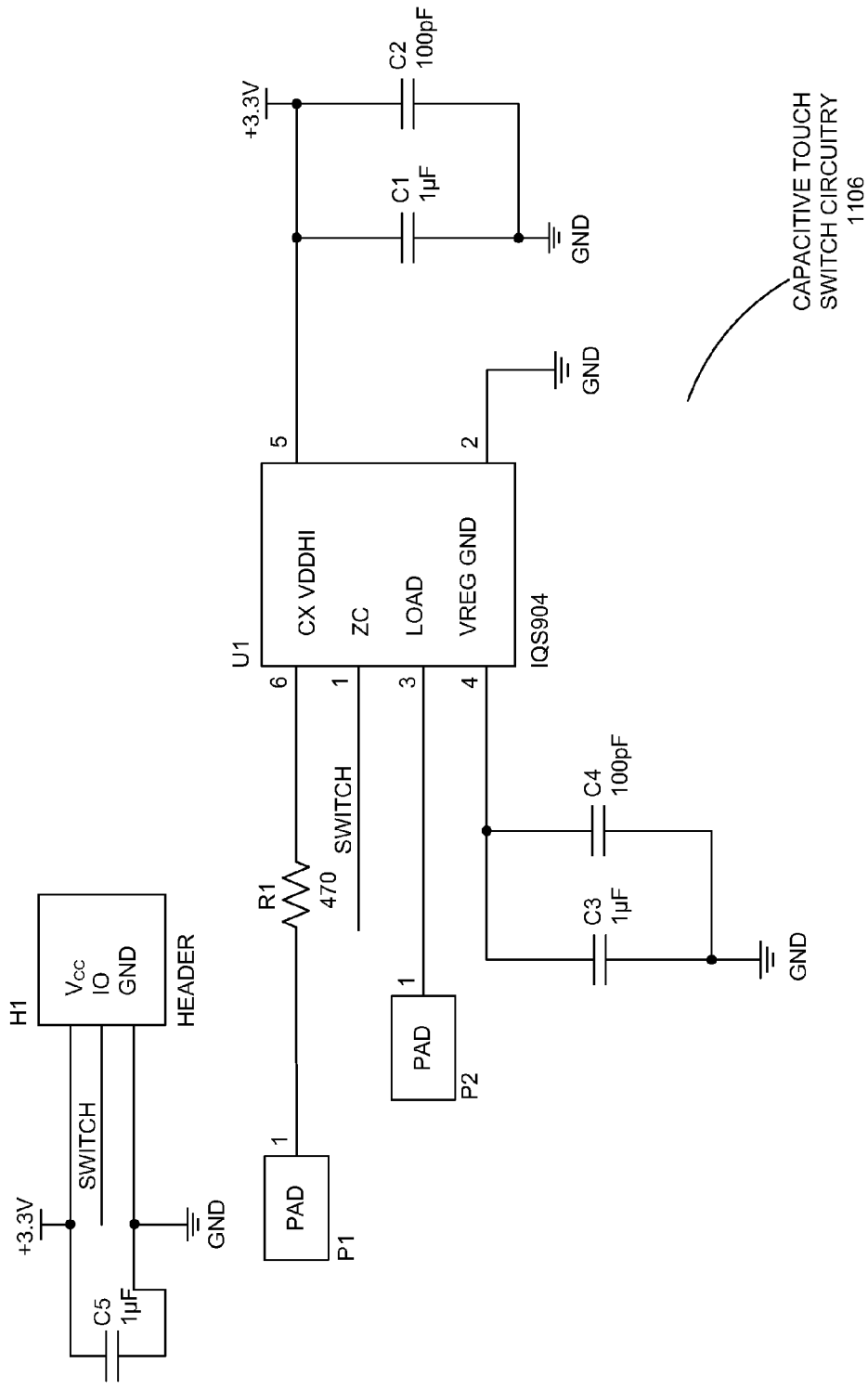
FIG. 11C provides a representation of a capacitive touch switch circuitry of the document scanning system.
Figure 11D:
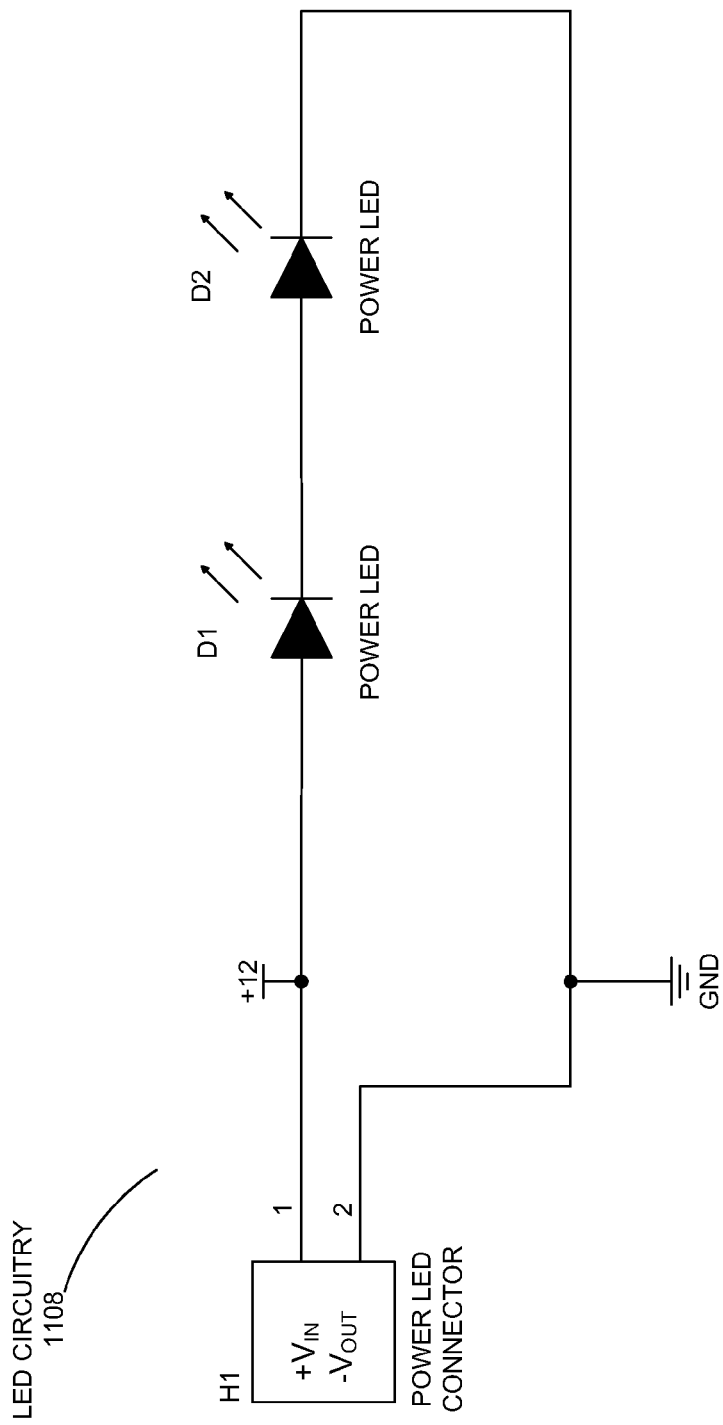
FIG. 11D provides a representation of a LED circuitry of the document scanning system.

FIGS. 11A-D provide circuitry diagrams for specific components of the document scanning system 100. Specifically, FIG. 11A provides a representation of the mobile detection sensor circuitry 1102 for the document scanning system 100. FIG. 11B provides a representation of the main box controller circuitry 1104 of the document scanning system 100. FIG. 11C provides a representation of the capacitive touch switch circuitry 1106 of the document scanning system 100. FIG. 11D provides a representation of the LED circuitry 1108 of the first lighting element 128 and the second lighting element 130 of the document scanning system 100.

Figure 12A:
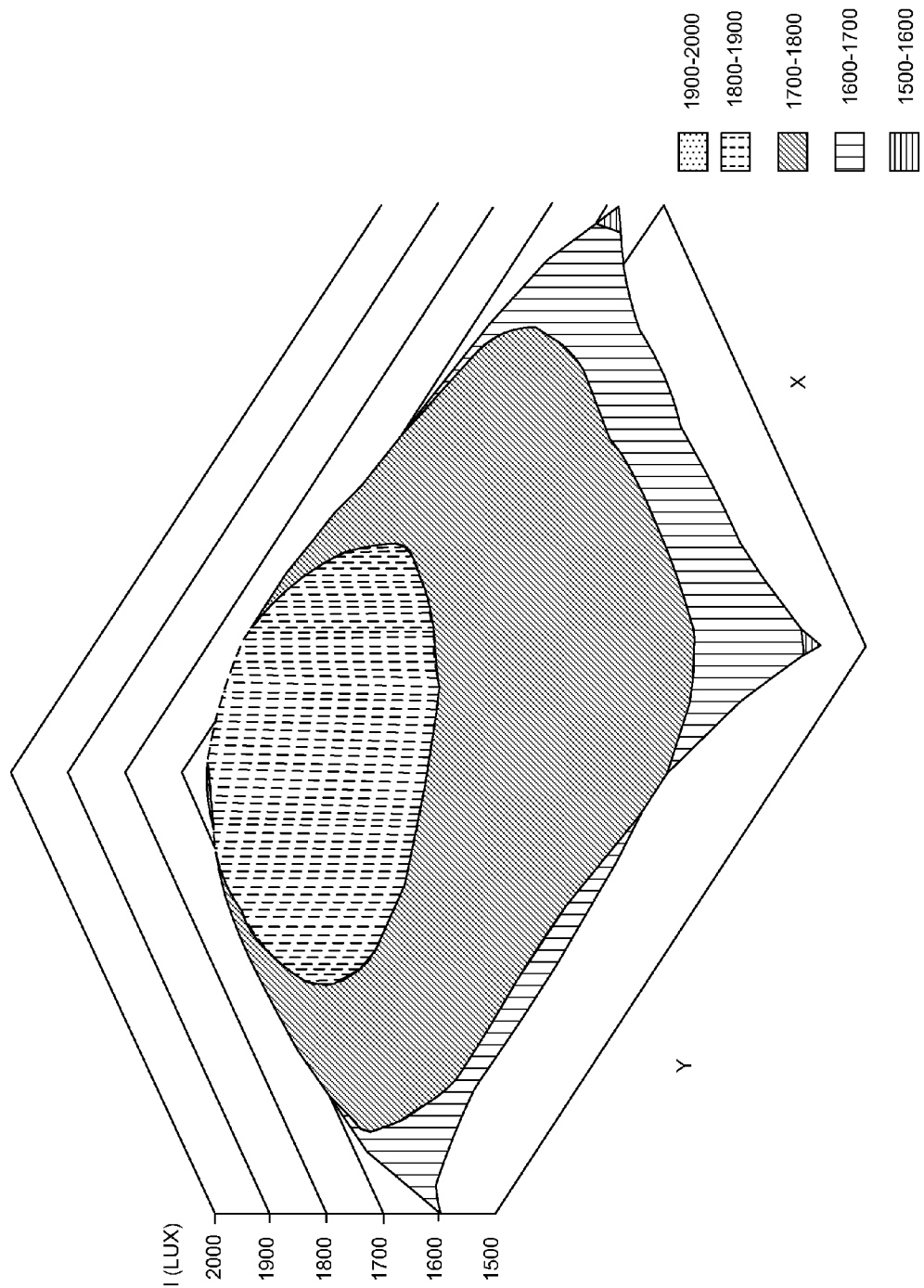
FIG. 12A demonstrates an environment dependent lighting luminosity pattern created by the document scanning system of FIG. 1.

FIG. 12A represents an instance of an environment dependent lighting luminosity pattern created by the document scanning system 100 of FIG. 1. As can be seen in the figure, there is a high lux concentration in the center of the document placement deck 103, as shown in the 3-dimensional graph of the light intensity profile of FIG. 12A. Specifically, the central area of the document placement deck 103 may be highly illuminated (e.g. lux range of 1900-2000) while the peripheral area may receive a lower illumination (e.g. lux range of 1500-1800). This produces a more natural, more symmetrical, and brighter lighting effect.

Figure 12B:
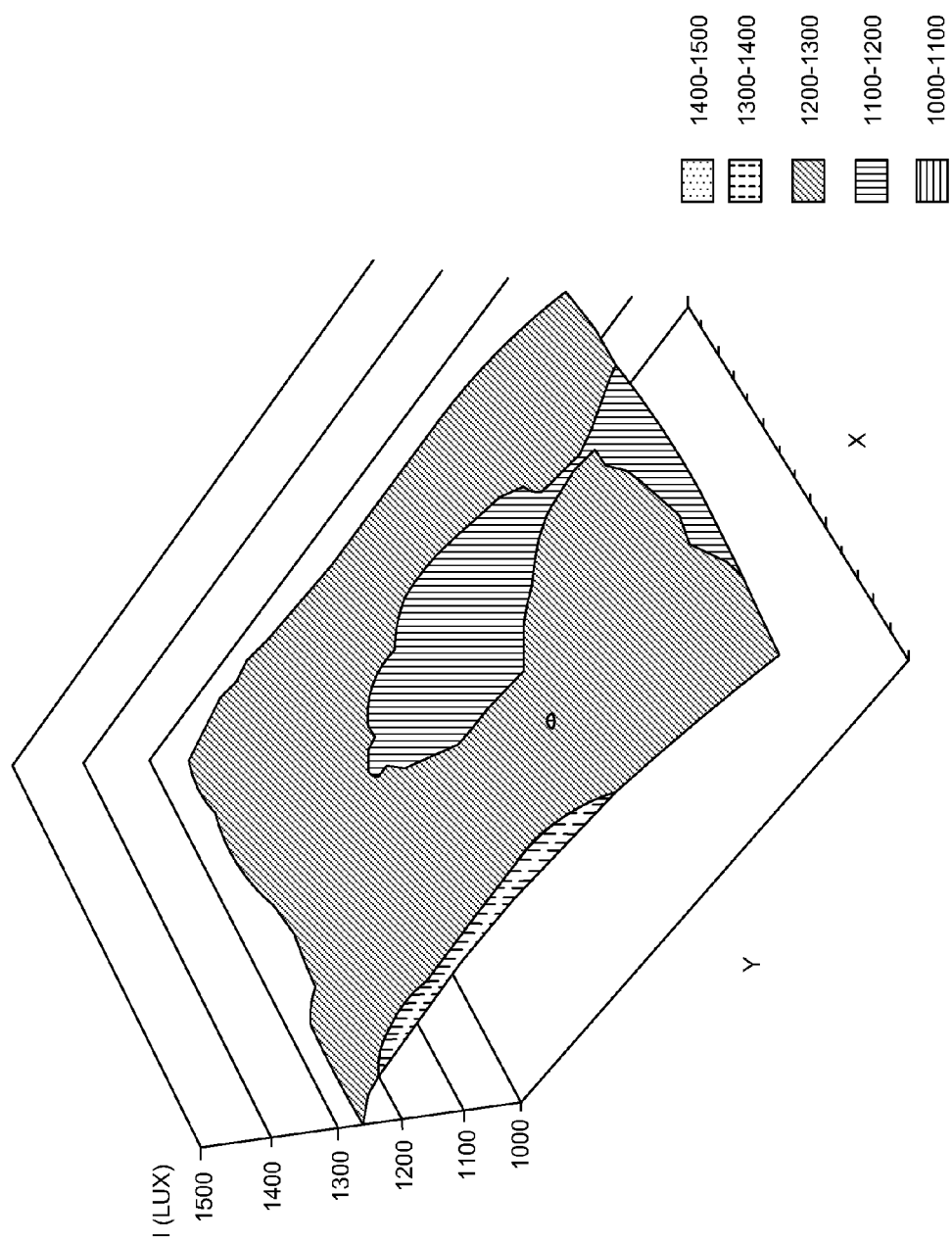
FIG. 12B demonstrates another environment dependent lighting luminosity pattern created by an alternate lighting system

FIG. 12B represents another environment dependent lighting luminosity pattern created by an alternate lighting system not shown in the figures. In comparison to the light intensity profile of FIG. 12A, the light intensity profile created by the alternate lighting system may represent a lower lux range with less variability of illumination across the document placement deck 103. Such an alternate lighting system may be more beneficial when the document scanning system 100 is used in select lighting environments.

Figure 13:
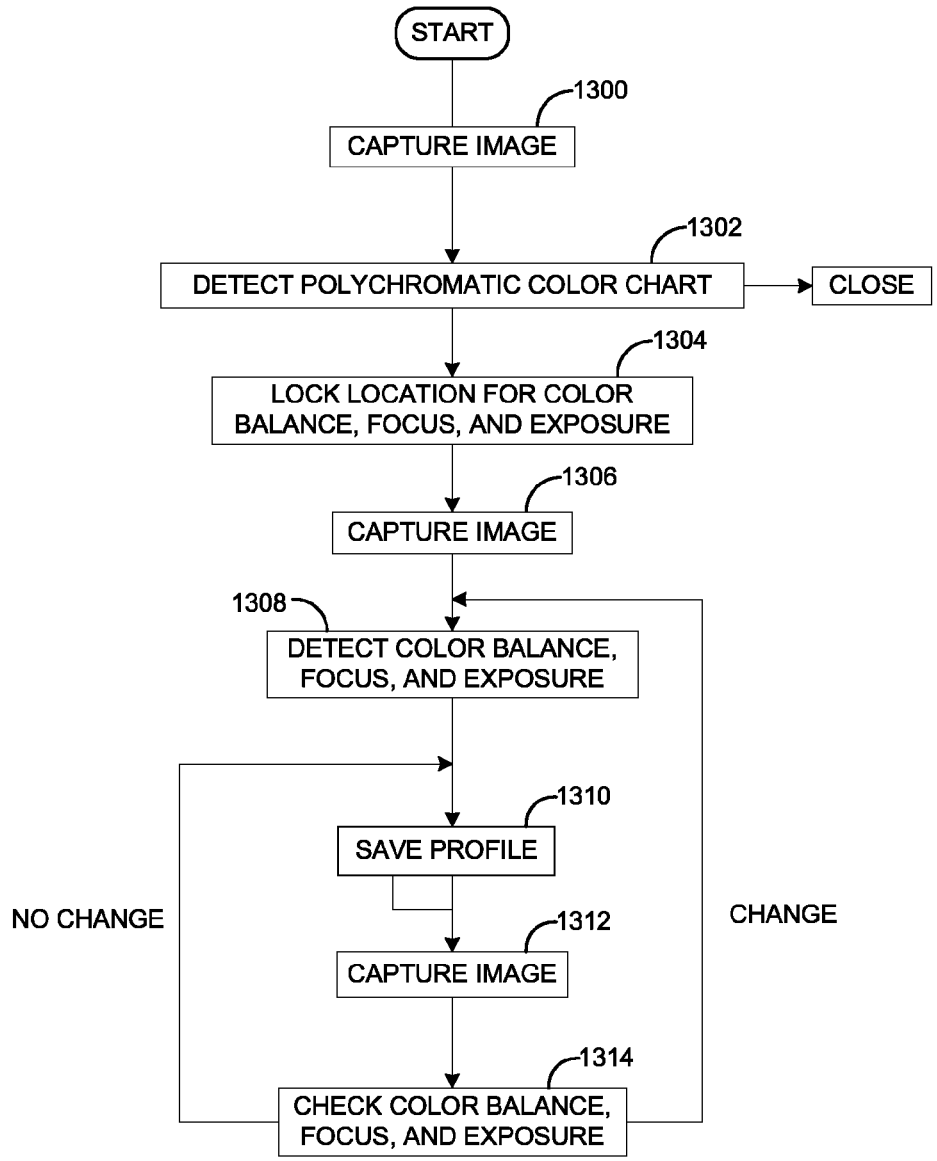
FIG. 13 is a flowchart diagram detailing the steps to scan a document and/or capture an image with or without true color enhancement through a mobile application.

FIG. 13 is a flowchart diagram detailing the steps to scan a document and/or capture an image with or without true color enhancement through the mobile application described above. Operations 1300 to 1314 of FIG. 13 may be instructions stored in a memory of the mobile device, wherein such instructions are implemented using a processor and certain other components of the mobile device (including, but not limited to, a camera of the mobile device and a light source of the mobile device). According to FIG. 13, operation 1300 may comprise of instructions to the processor, camera, and memory of the mobile device to capture a preview image of the image captured (wherein such an image may be an image of the document to be scanned). In operation 1302, the processor, camera, and memory may be instructed to focus and expose the image captured. In operation 1304, a decision may be made to whether proceed in capturing the image or to return to operation 1300 to capture the preview image again if the focusing step was not completed.

Operation 1306 may involve capturing the image and operation 1308 may involve detecting the polychromatic color chart 132 on the surface of the document placement deck 103. In operation 1308, a decision may be made to whether proceed in querying a color profile of the polychromatic color chart 132 or to disable a true color enhancement process (operation 1312). Disabling a true color enhancement process (operation 1312) may be necessary if a user uses the mobile application to capture a scanned image without using the document scanning system 100. In this latter case, the processor of the mobile device may instruct the processor of the mobile device to go directly to the last step of the process. Operation 1314 may involve querying a color profile from color profile database and then detecting and calculating an actual pixel-per-inch or dots-per-inch (DPI) of the capture image in operation 1306. Finally, the color profile may be saved and the color profile may be applied to the captured image.

What is claimed is:

1. A document scanning system, comprising:
    a base element comprising a document placement deck;
    a neck element, positioned at a fixed distance from the document placement deck, comprising a head end and a base end and coupled to the base element at the base end;
    a doublet of lighting arms, positioned at a fixed distance from the document placement deck, comprising a first lighting arm, positioned at a fixed distance from the center point of the document placement deck, and a second lighting arm, positioned at a fixed distance from the center point of the document placement deck and positioned at a fixed distance from the first lighting arm, wherein:
        the first lighting arm and the second lighting arm are coupled to at least one of the base element and the neck element and are positioned above the base element,
        the first lighting arm comprises at least a first lighting element coupled to the first lighting arm and the second lighting arm comprises at least a second lighting element coupled to the second lighting arm;
        the first lighting element and the second lighting element is configured to emit a total light color temperature of between 4,100 to 5,900 Kelvin,
        the first lighting element and the second lighting element are positioned symmetrically with respect to the center point on the document placement deck, and
        the first lighting element and the second lighting element is configured to generate a combined brightness output on a top surface of the document placement deck of between 1,500 to 2,500 lux;
    a docking head coupled to the head end of the neck element and comprising an image capture opening and a docking cradle;
    a mobile device positioned in the docking cradle and having a user interface face of the mobile device directed away from the document placement deck and an image capture lens directed toward the document placement deck through the image capture opening to capture a scanned image;
    the first lighting element and the second lighting element, wherein the first lighting element and the second lighting element are non-planar, are configured to generate a luminosity difference between the darkest portion of the scanned image and the brightest portion of the scanned image between 0 to 25%;
    wherein the first lighting element is positioned at a fixed distance from the image capture opening and the second lighting element is positioned at a fixed distance from the image capture opening; and
    wherein the mobile device is at least one of a smartphone, a tablet computer, a digital audio player, a digital camera, and a personal digital assistant.

2. The document scanning system of claim 1, further comprising:
    a non-residue forming adhesive layer applied to the surface of the document placement deck.

3. The document scanning system of claim 1, further comprising:
    a switch coupled to at least one of the first lighting arm and the second lighting arm and used to turn on the first lighting arm and the second lighting arm, wherein the switch is at least one of a tactile switch, an electromechanical switch, a capacitive switch, a remote switch, and a sensor switch.

4. The document scanning system of claim 1, wherein the document placement deck comprises a matte finish.

5. The document scanning system of claim 1, wherein:
    the docking head comprises a docking port that charges the mobile device and allows the mobile device to communicate with a display unit through at least an adapter connection, and wherein the display unit comprises at least one of a television, a monitor, and a projector.

6. The document scanning system of claim 1, wherein:
    the docking head is removable.

7. The document scanning system of claim 1, wherein:
    wherein the base element is inclined between one and 15 degrees.

8. A document visualization and presentation system, comprising:
    a base element comprising a document placement deck;
    a neck element, positioned at a fixed distance from the document placement deck, comprising a head end and a base end and coupled to the base element at the base end;
    a doublet of lighting arms, positioned at a fixed distance from the document placement deck, comprising a first lighting arm, positioned at a fixed distance from the center point of the document placement deck, and a second lighting arm, positioned at a fixed distance from the center point of the document placement deck and positioned at a fixed distance from the first lighting arm, wherein:
        the first lighting arm and the second lighting arm are coupled to at least one of the base element and the neck element and are positioned above the base element,
        the first lighting arm comprises at least a first lighting element coupled to the first lighting arm and the second lighting arm comprises at least a second lighting element coupled to the second lighting arm;
        the first lighting element and the second lighting element is configured to emit a total light color temperature of between 4,100 to 5,900 Kelvin,
        the first lighting element and the second lighting element are positioned symmetrically with respect to the center point on the document placement deck, and
        the first lighting element and the second lighting element is configured to generate a combined brightness output on a top surface of the document placement deck of between 1,500 to 2,500 lux;
        the first lighting element and the second lighting element, wherein the first lighting element and the second lighting element are non-planar, are configured to generate a luminosity difference between the darkest portion of the scanned image and the brightest portion of the scanned image between 0 to 25%;

a docking head coupled to the head end of the neck element and comprising an image capture opening and a docking cradle, wherein:

the docking head comprises a docking port that charges a mobile device and allows the mobile device to communicate with a display unit through at least one of an adapter connection and a wireless network, and wherein the display unit comprises at least one of a television, a monitor, and a projector;

the mobile device positioned in the docking cradle and having a user interface face of the mobile device directed away from the document placement deck and an image capture lens directed toward the document placement deck through the image capture opening to capture at least an image and a video to be visualized on the display unit;

wherein the first lighting element is positioned at a fixed distance from the image capture opening and the second lighting element is positioned at a fixed distance from the image capture opening; and wherein the mobile device is at least one of a smartphone, a tablet computer, a digital audio player, a digital camera, and a personal digital assistant.

* * * * *